(12) United States Patent
Oikawa et al.

(10) Patent No.: US 10,543,660 B2
(45) Date of Patent: Jan. 28, 2020

(54) HEAT-INSULATION SHEET, ELECTRONIC DEVICE USING SAME, AND METHOD FOR PRODUCING HEAT-INSULATION SHEET

(71) Applicant: Panasonic Intellectual Property Management Co., Ltd., Osaka (JP)

(72) Inventors: Kazuma Oikawa, Osaka (JP); Kei Toyota, Osaka (JP); Shinji Okada, Osaka (JP); Shigeaki Sakatani, Osaka (JP)

(73) Assignee: Panasonic Intellectual Property Managment Co., Ltd., Osaka (JP)

( * ) Notice: Subject to any disclaimer, the term of this patent is extended or adjusted under 35 U.S.C. 154(b) by 22 days.

(21) Appl. No.: 15/309,796

(22) PCT Filed: Mar. 16, 2016

(86) PCT No.: PCT/JP2016/001499
§ 371 (c)(1),
(2) Date: Nov. 8, 2016

(87) PCT Pub. No.: WO2016/157784
PCT Pub. Date: Oct. 6, 2016

(65) Prior Publication Data
US 2017/0266920 A1    Sep. 21, 2017

(30) Foreign Application Priority Data
Mar. 30, 2015  (JP) .................. 2015-067868

(51) Int. Cl.
*B32B 37/14*     (2006.01)
*B32B 9/00*      (2006.01)
(Continued)

(52) U.S. Cl.
CPC .............. *B32B 9/005* (2013.01); *B32B 5/022* (2013.01); *B32B 5/24* (2013.01); *B32B 37/14* (2013.01);
(Continued)

(58) Field of Classification Search
CPC ......... B32B 37/14; B32B 38/08; B32B 5/022; B32B 5/24; B32B 5/245; B32B 9/00;
(Continued)

(56) References Cited

U.S. PATENT DOCUMENTS 4,447,345 A * 5/1984 Kummermehr .......... B32B 9/04
                                                         252/62
5,786,059 A    7/1998 Frank et al.
(Continued)

FOREIGN PATENT DOCUMENTS

JP    2001-009231    1/2001
JP    4237253 B      3/2009
(Continued)

OTHER PUBLICATIONS

JP-2011162756-A Machine Translation.*
(Continued)

*Primary Examiner* — Travis M Figg
(74) *Attorney, Agent, or Firm* — Panasonic IP Management; Kerry S. Culpepper

(57) ABSTRACT

A heat-insulation sheet includes a first silica xerogel layer, a second silica xerogel layer, and a composite layer. The first silica xerogel layer includes a first silica xerogel, and the second silica xerogel layer includes a second silica xerogel. The composite layer is located between the first silica xerogel layer and the second silica xerogel layer, and includes at least one type of unwoven fabric fibers, and a third silica xerogel. The third silica xerogel is located in a spatial volume of the unwoven fabric fibers.

20 Claims, 3 Drawing Sheets

(51) Int. Cl.
  *B32B 5/02* (2006.01)
  *C01B 33/16* (2006.01)
  *B32B 5/24* (2006.01)
  *B32B 38/08* (2006.01)
  *F16L 59/02* (2006.01)

(52) U.S. Cl.
  CPC .............. *B32B 38/08* (2013.01); *C01B 33/16* (2013.01); *F16L 59/029* (2013.01); *B32B 2266/128* (2016.11); *B32B 2307/304* (2013.01); *B32B 2457/00* (2013.01)

(58) Field of Classification Search
  CPC . B32B 9/005; B32B 2255/02; B32B 2255/20; B32B 2260/021; B32B 2262/023; B32B 2262/0253; B32B 2262/0284; B32B 2262/101; B32B 2262/108; B32B 2266/128; B32B 2307/304; B32B 2457/00; B32B 2457/04; C01B 33/16; F16L 59/026; F16L 59/028; F16L 59/029
  See application file for complete search history.

(56) References Cited

U.S. PATENT DOCUMENTS

| | | | | |
|---|---|---|---|---|
| 5,866,027 | A * | 2/1999 | Frank | B01J 13/0091 |
| | | | | 252/62 |
| 2005/0167891 | A1 | 8/2005 | Lee et al. | |
| 2005/0196432 | A1 * | 9/2005 | Munro | A61L 15/425 |
| | | | | 424/445 |
| 2010/0244005 | A1 | 9/2010 | Gyoda | |
| 2012/0074347 | A1 * | 3/2012 | Gordon-Duffy | C08J 9/0019 |
| | | | | 252/62 |
| 2013/0174344 | A1 * | 7/2013 | Klancnik | A47C 27/064 |
| | | | | 5/636 |
| 2014/0252263 | A1 * | 9/2014 | Besselievre | C04B 28/005 |
| | | | | 252/62 |
| 2014/0376191 | A1 * | 12/2014 | Hwang | F28F 13/003 |
| | | | | 361/720 |
| 2015/0077957 | A1 * | 3/2015 | Sakatani | B32B 7/12 |
| | | | | 361/757 |

FOREIGN PATENT DOCUMENTS

| | | |
|---|---|---|
| JP | 2011-162756 | 8/2011 |
| JP | 2011-162902 | 8/2011 |
| JP | 2011162756 A * | 8/2011 |
| JP | 2011-208344 | 10/2011 |
| JP | 4898435 B | 3/2012 |
| JP | 2013024341 A * | 2/2013 |
| JP | 2013-100406 | 5/2013 |
| JP | 2013-112625 A | 6/2013 |
| JP | 5267439 B | 8/2013 |
| JP | 2014-237910 A | 12/2014 |
| JP | 2016-011485 | 1/2016 |
| JP | 2016-068543 | 5/2016 |

OTHER PUBLICATIONS

Coquil et al. ("Thermal conductivity of cubic and hexagonal mesoporous silica thin films" J. App. Phys. 2009, 106, 034910) (Year: 2009).*
Uto et al. (JP 2011/162756 A1, machine translation) (Year: 2011).*
Ding et al ("Silica Xerogel coating on the surface of natural and synthetic fabrics" Surface & Coating Technology 2008, 202, 4721-4727) (Year: 2008).*
International Search Report of PCT application No. PCT/JP2016/001499 dated Jun. 14, 2016.
The Extended European Search Report dated Aug. 9, 2017 for the related European Patent Application No. 16771678.6.

* cited by examiner

HEAT-INSULATION SHEET, ELECTRONIC DEVICE USING SAME, AND METHOD FOR PRODUCING HEAT-INSULATION SHEET

CROSS-REFERENCE TO RELATED APPLICATIONS

This application is a U.S. national stage application of the PCT International Application No. PCT/JP2016/001499 filed on Mar. 16, 2016, which claims the benefit of foreign priority of Japanese patent application No. 2015-067868 filed on Mar. 30, 2015, the contents all of which are incorporated herein by reference.

TECHNICAL FIELD

The present disclosure relates to a heat-insulation sheet, a method for producing the same, and an electronic device including the heat-insulation sheet.

BACKGROUND ART

Currently, portable devices are becoming widespread at a fast pace. In the days ahead, portable devices will further be downsized and thinner, and offer more technical advantages. In this case, there would be many cases where persons hold and manipulate portable devices in their hand over a prolonged period of time. For this reason, it is important to keep surfaces of portable devices at low temperatures.

As an example of a method for preventing a rise in the temperature of the surface of a portable device, a method in which a graphite sheet is placed directly above a heat-generating component inside the portable device can be mentioned. In this method, the heat from the heat-generating component is dissipated through the graphite sheet to even the temperature distribution inside the portable device, thereby suppressing the local temperature rise (PTL 1). However, with advancement in performance of semiconductor chips that are heat-generating components, the surface reaching temperature has been higher than ever before, and the heat countermeasure relying solely on graphite sheets now has limitations.

Hence, a combination of a graphite sheet and a heat-insulating material can be considered. As an example of a heat-insulating material having high heat-insulating performance, silica aerogels can be mentioned.

Silica aerogels have been known as nanoscale porous bodies that have a porosity of 90% or more. Furthermore, silica aerogels are superior to existing heat-insulating materials in terms of curing deterioration and heat resistance, and are known to have an excellent heat conductivity of around 15 mW/mK. However, since a network structure in which silica particles on the scale of several tens of nanometers are connected through point contact is formed in silica aerogels, their mechanical strength is not very high. Therefore, in order to overcome the weakness, attempts to combining silica aerogels with fibers or unwoven fabrics, resins, etc. to improve their strength have been studied.

PTL 2 proposes a method in which a sol of silica aerogel is sprayed onto a fiber material including two components, low-melting-point fibers and high-melting-point fibers, and the fiber material is thermally compressed to produce a heat-insulation material. In this method, the low-melting-point fibers are thermally compressed at a temperature equal to or higher than the melting point to bind the silica aerogels and the fibers, thereby alleviating omissions of aerogels.

Furthermore, with regard to composites of silica aerogels and fiber resins, PTL 3 and PTL 4 have been known.

CITATION LIST

Patent Literature

PTL 1: Japanese Patent No. 5,267,439
PTL 2: Japanese Patent No. 4,237,253
PTL 3: Japanese Patent No. 4,898,435
PTL 4: Japanese Patent Unexamined Publication No. 2013-100406

SUMMARY OF THE INVENTION

The disclosure provides a heat-insulation sheet that has uniform thickness and excellent heat-insulation properties, a device using the same, and a method for producing the heat-insulation sheet.

A heat-insulation sheet according to another aspect of the disclosure includes a first silica xerogel layer, a second silica xerogel layer, and a composite layer. The first silica xerogel layer includes a first silica xerogel, and the second silica xerogel layer includes a second silica xerogel. The composite layer is located between the first silica xerogel layer and the second silica xerogel layer, and includes at least one type of unwoven fabric fibers, and a third silica xerogel. The third silica xerogel is located in a spatial volume in the unwoven fabric fibers.

An electronic device according to yet another aspect of the disclosure includes an electronic component that involves heat generation, and a casing that houses the electronic component, and the above-described heat-insulation sheet is placed between the electronic component and the casing.

Furthermore, still another aspect of the disclosure relates to a method for producing the above-described sheet. In this method, unwoven fabric fibers are impregnated with a sol solution, followed by converting the sol solution into a gel, and thus, a composite layer is formed. Then, the composite layer is placed between films, and pressure is applied to the resulting material to form a first silica xerogel layer and a second silica xerogel layer on the surfaces of the composite layer.

The heat-insulation sheet according to the disclosure can produce sufficient heat-insulation effects even in a narrow space inside a casing of an electronic device, and can effectively reduce heat transfer from a heat-generating component to the casing. Since the heat-insulation sheet according to the disclosure exhibits a thermal conductivity lower than those of conventional heat-insulation sheets, the heat-insulation sheet produces sufficient heat-insulation effects even when it is thin.

DESCRIPTION OF EMBODIMENTS

Prior to description of embodiments according to the disclosure, problems in conventional arts will briefly be described. In the above-mentioned method in PLT 2, molten fiber resins penetrate into nanometer-scale fine pores in the silica aerogel when the low-melting-point fibers are melted. As a result, the thermal conductivity of the composite material will be increased to as high as 27 mW/mK, and heat-insulation properties will be impaired. Therefore, it is difficult to effectively block heat flow from a heat-generating component to a low heat-resistant component in a limited space by the method. Furthermore, the same problem also applies to PLT 3 and PLT 4.

In recent years, miniaturization and thinning of electronic devices have further proceeded, and spaces inside the casings in which thick heat-insulation materials are placed are becoming very small. In order to effectively insulate heat in very limited spatial volumes as found in portable devices, it is required that intrinsic heat-insulation properties of materials themselves are dramatically enhanced such that the heat can effectively be insulated, even if thicknesses of the heat-insulation materials themselves are small.

Moreover, variations in the thicknesses need to be reduced. However, no thin but high-performance heat-insulation sheets that enable effective heat insulation have yet to be proposed. Furthermore, attempts to reduce variations in thicknesses of the heat-insulation sheets have not been studied on the assumption that the heat-insulation sheets are incorporated into narrow spaces inside casings.

Hereinafter, embodiments of the disclosure that solve the above-mentioned problems will be described with reference to drawings.

<Heat-Insulation Sheet 103>

Figure 1:
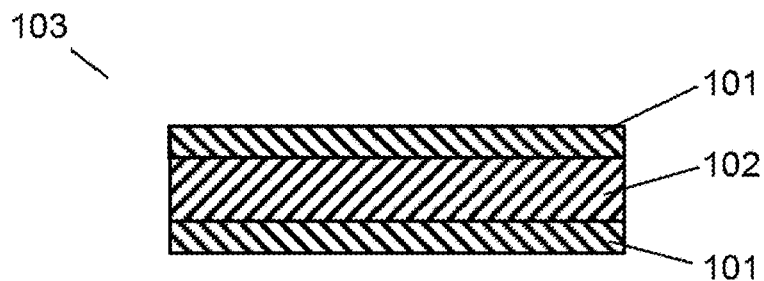
FIG. 1 is a cross-sectional view of a heat-insulation sheet according to an embodiment.

FIG. 1 is a cross-section view of a heat-insulation sheet 103 according to an embodiment. The heat-insulation sheet 103 includes a composite layer 102 that includes an unwoven fabric and a silica xerogel, and silica xerogel layers 101 that are respectively located on the upper and lower surfaces of the composite layer 102. For example, the silica xerogel layer 101 on the upper surface may be a first silica xerogel layer, and the silica xerogel layer 101 on the lower surface may be a second silica xerogel layer.

<Silica Xerogel Layer 101>

Silica xerogel layers 101 with a thickness of at least 10 nm or more are present on surfaces (both surfaces) of the composite layer 102. The silica xerogel layers 101 are single layers including a silica xerogel. Single layers refer to layers that do not include fibers or the like but include only a silica xerogel. In addition, only one of the silica xerogel layers 101 may be a single layer including a silica xerogel.

In the silica xerogel layers 101, a network structure in which silica particles on the scale of 10 nm are connected through point contact is formed. Accordingly, when the thicknesses of the silica xerogel layers 101 are 10 nm or more, the entire surfaces of the silica xerogel layers 101 are occupied with the silica xerogel. In addition, only one of the silica xerogel layers 101 may have a thickness of 10 nm or less.

Furthermore, if the silica xerogel layers 101 are made thick, the heat-insulation performance will be increased, but the strength will be low. Therefore, the silica xerogel layers 101 preferably have a thickness of 100 nm or less. In addition, only one of the silica xerogel layers 101 may have a thickness of 100 nm or less.

<Composite Layer 102>

The composite layer 102 includes a silica xerogel and unwoven fabric fibers. The composite layer 102 is a main element of the heat-insulation sheet 103. In the composite layer 102, the silica xerogel is located in a special volume in the unwoven fabric fibers.

<Thermal Conductivity of the Heat-Insulation Sheet 103>

The thermal conductivity of the heat-insulation sheet 103 would be 0.014 to 0.024 W/mK. The thermal conductivity can be regarded as a sum of the thermal conductivity of the unwoven fabric fibers and the thermal conductivity of the silica xerogel present in voids in the unwoven fabric.

The thermal conductivity of the unwoven fabric is 0.030 to 0.060 W/mK. The thermal conductivity of the silica xerogel is 0.010 to 0.015 W/mK. These materials are combined so as to exhibit the above-mentioned thermal conductivity.

<Silica Xerogel>

Silica xerogels are present in the composite layer 102 and the silica xerogel layers 101 on both surfaces of the composite layer 102. The silica xerogels in these three layers may be the same or different from one another. In addition, the silica xerogels in the three layers are the same in the example described below. That is, the silica xerogels are continuous and connected from the composite layer 102 to the silica xerogel layers 101 on both surfaces of the composite layer 102.

However, different silica xerogels may separately be provided in the respective silica xerogel layers 101 on both surfaces. Different silica xerogels broadly mean silica xerogels that are not produced under the same conditions, and densities, compositions, etc. may be different.

The silica xerogels are inorganic porous bodies, and have a porosity of 90% or more. The silica xerogels do not include a low-thermal-conductivity foaming gas such as $CO_2$ and cyclopentane, and a pore size of 68 nm or less, which corresponds to the air mean free path. This makes it possible for them to have excellent heat-insulation effects. Since the xerogels form network structures in which silica particles on the scale of several tens of nanometers are connected through point contact, they have insufficient mechanical strength. In the present application, "silica aerogels" refer to those obtained by supercritical drying, and "silica xerogels" refer to those obtained by ordinary-pressure drying, and these are used differently depending on the drying methods.

<Thickness of the Heat-Insulation Sheet 103>

The thickness of the heat-insulation sheet 103 is preferably within a range of 0.03 mm to 1.5 mm, more preferably within a range of 0.05 mm to 1.0 mm. In this case, silica xerogel layers 101 are formed on the upper and lower surfaces of the heat-insulation sheet 103, and single layers, i.e., silica xerogel layers 101 of 10 nm or more, are included on the outermost surfaces of the unwoven fabric fibers of the composite layer 102.

When the thickness of the heat-insulation sheet 103 is smaller than 0.03 mm, heat-insulation effects in the thickness direction will decrease. Therefore, unless a very low thermal conductivity around the level of vacuum is realized, heat transmission from the one surface to the other surface in the thickness direction cannot successfully be prevented.

When the thickness of the heat-insulation sheet 103 is larger than 0.05 mm, sufficient heat-insulation effects in the thickness direction can be secured.

On the other hand, when the thickness of the heat-insulation sheet 103 is larger than 1.0 mm, it will be difficult to incorporate the heat-insulation sheet 103 into portable devices that have recently progressively been thinned and downsized. In particular, if the thickness of the heat-insulation sheet 103 is larger than 1.5 mm, it becomes even more difficult to incorporate it into mobile devices such as smartphones and tablets.

<Content Ratio of Silica Xerogels in the Heat-Insulation Sheet 103>

An optimum range for the proportion of silica xerogels to the weight of the heat-insulation sheet 103 (the total of silica xerogels in the silica xerogel layer 101 and the composite layer 102) varies with the unit weight, the bulk density and the thickness of the unwoven fabric fibers. Therefore, it is difficult to define it unambiguously. However, if the proportion of the silica xerogels is at least 30 wt % or more, it would be sufficient.

If the proportion of the silica xerogels is less than 30 wt %, it becomes difficult to realize a low thermal conductivity, and also, variations in the thickness of the heat-insulation sheet 103 cannot be absorbed.

If the proportion of the silica xerogels is more than 80 wt %, flexibility and strength will be insufficient, and omissions of the silica xerogels possibly occur due to repeated use, although the thermal conductivity will be reduced. Therefore, if the proportion of the silica xerogels is 80 wt % or less, it would be sufficient.

<Unit Weight of Unwoven Fabric Fibers>

5 to 120 g/m$^2$ was used as a unit weight of the unwoven fabric fibers used for the composite layer 102. The unit weight will be described in examples described below. In addition, the unit weight refers to a weight per unit area.

<Thickness of Unwoven Fabric Fibers>

In general, variations in the thickness of the unwoven fabric fibers would be large although it varies with a method for producing unwoven fabric fibers. For the purpose of absorbing (alleviating) the variations in the thickness, the spatial volume in unwoven fabric fibers is filled with a silica xerogel, and silica xerogel layers 101 are further formed on the upper and lower surfaces thereof. Therefore, unwoven fabric fibers that have a thickness within a range of 60% to 90% with respect to the mean target thickness of the heat-insulation sheet 103 is preferably selected. When the thickness of the unwoven fabric fibers is within a range of 60% to 90% of the target thickness, variations in the thickness of the unwoven fabric fibers can be alleviated while flexibility distinctive to unwoven fabric fibers can be kept.

<Bulk Density of Unwoven Fabric Fibers>

The bulk density of unwoven fabric fibers is preferably within a range of 100 kg/m$^3$ to 500 kg/m$^3$. When the bulk density is within this range, the content ratio of the silica xerogel in the heat-insulation sheet 103 can be increased, thereby further reducing the thermal conductivity.

In order to use unwoven fabric fibers that involve mechanical strength as a continuous body, it is required that the bulk density is at least 100 kg/m$^3$. Furthermore, if the bulk density of unwoven fabric fibers is larger than 500 kg/m$^3$, the spatial volume in the unwoven fabric fibers will be reduced. Therefore, a silica xerogel that can be filled into the unwoven fabric fibers will relatively be reduced, and the thermal conductivity will be higher. A value of the bulk density will be described also in examples below.

<Type of a Material of Unwoven Fabric Fibers>

For a type of a material of unwoven fabric fibers used for the composite layer 102, inorganic fiber types such as glass wool and rock wool, organic fiber types such as polyethylene terephthalate (PET), polyphenylene sulfide (PPS), polypropylene (PP) and polytetrafluoroethylene (PTFE), natural types such as sheep wool or cellulose, etc. can be used. That is, the unwoven fabric fibers used for the composite layer 102 include inorganic unwoven fabric fibers or organic unwoven fabric fibers serving as a main component.

<Method for Producing a Heat-Insulation Sheet 103 and Materials Used Therefor>

Figure 2:
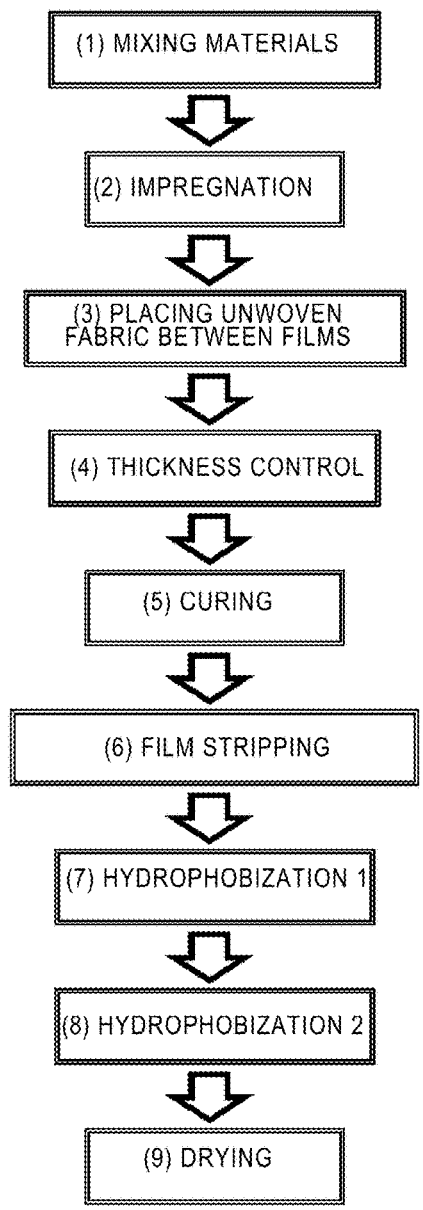
FIG. 2 is a flowchart that shows a method for producing the heat-insulation sheet shown in FIG. 1.

FIG. 2 is a flowchart that shows a method for producing a heat-insulation sheet 103. One example of the method for producing a heat-insulation sheet 103 will be illustrated below with reference to FIG. 2.

(1) Mixing Materials 0.31 part by weight (1.4 wt %) of concentrated hydrochloric acid serving as a catalyst is added to 22.29 parts by weight of a high-molar silicate aqueous solution (TOSO SANGYO Co., Ltd., SiO$_2$ concentration: 14 wt %), and the resulting mixture is stirred, thereby preparing a silica aerosol solution (hereinafter, referred to as a sol solution).

The type of silica material is not limited to high molar sodium silicate, and alkoxysilane or water glass (low molar ratio) may be used. The high molar silicate aqueous solution is a silica material that has a particle size distribution of SiO$_2$ primary particles within a range of about 2 to 20 nm, and that has a middle size between water glass and colloidal silica, and the sodium content is reduced to 1 wt % or less compared with ordinary water glass.

The SiO$_2$ concentration is preferably 10 wt % or more in order to maintain the strength of the silica xerogel. In order to reduce solid heat-transferring components, thereby making the thermal conductivity small, the SiO$_2$ concentration is preferably 16 wt % or less. In order to promote a hydrolysis reaction of silicate in the high molar silicate aqueous solution, an acid catalyst is preferably added thereto.

As for a type of the acid used herein, inorganic acids such as hydrochloric acid, nitric acid, sulfuric acid, hydrofluoric acid, sulfurous acid, phosphoric acid, phosphorous acid, hypophosphorous acid, chloric acid, chlorous acid, and hypochlorous acid; acidic phosphates such as acidic aluminum phosphate, acidic magnesium phosphate, and acidic zinc phosphate; organic acids such as acetic acid, propionic acid, oxalic acid, succinic acid, citric acid, malic acid, adipic acid, and azelaic acid, etc. can be mentioned. The type of acid catalyst used herein is not limited, but hydrochloric acid is preferable in terms of gel-skeleton strength and hydrophobicity of the resulting silica xerogel.

With regard to the concentration of acid, for example, in case of hydrochloric acid, the concentration is preferably 1 to 12 N, more preferably 6 to 12 N. If the concentration is less than 1 N, it is required to add a larger amount of dilute hydrochloric acid when the pH of the high molar silicate aqueous solution is adjusted to a desired value, and therefore, the silicate concentration will be reduced, and development of the silica network may not effectively progress. When the acid concentration is 6 N or more, the amount of acid added will be only one-sixth that in the case where, for example, 1 N hydrochloric acid is added, and thus, it is possible to prevent reductions in the SiO$_2$ concentration.

The amount of acid catalyst added is preferably 0.5 to 6.0 parts by weight, more preferably 1.0 to 3.0 parts by weight with respect to 100 parts by weight of the hydrogel in a case where the acid catalyst is hydrochloric acid, a 12 N hydrochloric acid aqueous solution, although it depends on a value that the pH is adjusted to.

Gelation of the sol solution that has been prepared by adding the above-mentioned acid catalyst to the high molar silicate aqueous solution is carried out. Gelation of the sol is preferably carried out inside a closed container that does not cause a liquid solvent to volatilize.

When the high molar silicate aqueous solution is converted into a gel by adding an acid thereto, the value of pH at that time is preferably 4.0 to 8.0. If the pH is less than 4.0, or more than 8.0, the high molar silicate aqueous solution may not be converted into a gel, although it depends on the temperature at that time.

The temperature for gelation of the sol is preferably 0° C. to 100° C., more preferably 20° C. to 90° C. in case of ordinary pressure. If the temperature for gelation is less than 0° C., necessary heat will not be transferred to silicate monomers that serve as active species for the reaction, growth of silica particles will not be promoted, and therefore, it will take time for gelation to sufficiently progress. Furthermore, strength of the produced wet gel may be low, and the wet gel may significantly shrink during drying. In addition, there would also be a case in which a desirable silica xerogel cannot be obtained.

Furthermore, when the temperature for gelation exceeds 100° C., phenomena in which water is volatilized, and is separated from the gel inside the container, even if the container is sealed, would be observed. Accordingly, the volume of the resulting wet gel may be reduced, and there would be a case where a desirable silica xerogel cannot be obtained.

When the temperature for gelation is within a range of 20° C. to 90° C., moderate degree of growth of silica particles, and gelation by formation of a silica network can be promoted without impairing productivity. Furthermore, such a temperature range is even preferable because gelation can be induced without volatilizing the water content in the wet gel.

In addition, time for gelation varies with the temperature for gelation and curing time after gelation described below. However, the total of the gelation time and the curing time described below is preferably 0.5 to 72 hours, more preferably 2 to 24 hours.

Thus, by carrying out gelation and curing, the strength and stiffness of the gel wall can be improved, and a wet gel that hardly shrinks during drying can be obtained.

If the total of the gelation time and the curing time is less than 0.5 hour, improvements in the strength of the gel wall may be insufficient.

Furthermore, if the total of the gelation time and the curing time is larger than 72 hours, effects of curing to improvements in the strength of the gel wall may be scarce, and, to the contrary, the productivity may be impaired. When the total of the gelation time and the curing time is 2 to 24 hours, the productivity is not impaired, and sufficient improvements in the strength of the gel wall can be achieved. Therefore, such a range is even preferable.

(2) Impregnation

The sol solution is poured into an unwoven fabric (material: PET; thickness specification: 90 µm; unit weight: 12 g/m$^2$; bulk density: 130 kg/m$^3$; size: 12 cm square). The sol solution is pushed and impregnated into the unwoven fabric by a hand roll. With regard to the amount of the sol solution to be impregnated, an excessive amount of the sol solution (100 vol % or more) is used with respect to a theoretical spatial volume in unwoven fabric fibers. The theoretical spatial volume in the unwoven fabric is calculated from a bulk density of the unwoven fabric fibers. In addition, a material, thickness and bulk density of the unwoven fabric are not limited to the above specifications, as mentioned above. Furthermore, as for a method for impregnation, a method in which an unwoven fabric roll is soaked in the sol solution per roll, or a method in which the sol solution is coated onto an unwoven fabric from a dispenser or spray nozzle while the unwoven fabric is delivered by roll to roll at a constant rate may be used. In terms of productivity, the roll to roll type system is preferable.

(3) Placing the Unwoven Fabric Between Films

The unwoven fabric that has been impregnated with the sol solution is placed between PP films (propylene films 50 µm thick×2; size: B6), and this is allowed to stand at a room temperature of 23° C. for about 20 minutes to convert the sol solution to a gel. Thus, a composite layer that includes the unwoven fabric fibers and the silica xerogel located in the spatial volume in the unwoven fabric fibers is formed. A material and a thickness of the films that hold the unwoven fabric are not limited to those specified above.

Materials for films are favorably polypropylene (PP), polyethylene terephthalate (PET) and the like since heating is required in the curing step. As for a type of material for the films, a resin material that has a maximum usable temperature of 100° C. or more, and that has a linear thermal expansion coefficient of $100(\times 10^{-6}/°$ C.) or less is preferable.

When a resin material that has a linear thermal expansion coefficient larger than 100 ($\times 10^{-6}/°$ C.) is used for the films, the difference in linear thermal expansion coefficients between the films and the unwoven fabric fibers or the gel will be large. Therefore, wrinkles may appear in the gel during a process in which the gel is cooled to room temperature after curing. In addition, even if the thickness of the unwoven fabric that has been impregnated with the sol solution is controlled by a certain method using a biaxial roll, a squeegee or the like without placing the unwoven fabric between films, etc., a large amount of the gel will be adhered to the surface of control jig.

Accordingly, in that case, control to a target thickness becomes impossible. Furthermore, variations in the thickness of the heat-insulation material are fomented, and a heat-insulation material that has a desired thermal conductivity cannot be obtained.

(4) Thickness Control

After formation of a gel is confirmed, the impregnated unwoven fabric with the films is caused to pass through biaxial rolls that have been set to a gap of 190 µm (including the film thickness). In this way, pressure is applied to the above-described composite layer with films. Thus, the excess gel is drawn from the unwoven fabric, and the thickness is controlled to a targeted thickness of 100 µm. In addition, a method for controlling the thickness is not limited to the above, and the thickness may be controlled by a method such as squeegee or press.

By drawing out the excessive gel, layers that serve as silica xerogel layers 101 are formed on both of the surfaces of the composite layer. The gel overflows, and thus, layers serving as silica xerogel layers 101 are formed on both of the surfaces of the portion of the unwoven fabric serving as the composite layer 102.

With regard to timing of thickness control, thickness control is preferably carried out after the sol solution that has been impregnated into the unwoven fabric is converted into a gel. The thickness control is preferably carried out within 90 minutes immediately after the sol solution is converted into a gel (state in which the fluidity is lost). If the thickness control is carried out before the sol solution is converted into a gel, effects by the thickness control cannot be obtained due to the presence of fluidity. On the other hand, after 90 minutes or more passed, hardening promotes, and the material reaches a state in which there is no fluidity. Therefore, pressure caused by the thickness control destroys the silica network, and cracks are caused in the gel. Furthermore, the gap in the thickness control is preferably set to a thickness that is obtained by reducing the total thickness, namely a sum of the target thickness and the thickness of the two films, by 5% to 20%.

For example, when the target thickness is 1.0 mm and the thickness of the film is 0.05 mm, the total thickness is 1.1 mm, and a set value for the gap is 0.88 to 1.05 mm.

The reason why the set value for the gap is made smaller than the total thickness is because the material will swell and be thick in subsequent steps (curing, hydrophobizing and drying steps), and therefore, the portion of swell thickness is subtracted in advance.

When the set value for the gap is less than 5% of the total thickness, as a result, the thickness of the heat-insulation sheet 103 may become larger than the target thickness. When the set value for the gap is larger than 20% of the thickness, the thickness of the resulting sheet deviates from +/−20% of the target thickness.

(5) Curing

The gel kept between films is put into a container, and the container is placed in a thermo-hygrostat chamber set to a temperature of 85° C. and a humidity of 85%, for 3 hours. This makes it possible to grow silica particles (a dehydration-condensation reaction of silanols), thereby forming a porous structure.

The curing temperature is preferably 50° C. to 100° C., more preferably 60° C. to 90° C. in case of ordinary pressure.

If the curing temperature is less than 50° C., in the same manner as the gelation step, required heat is not transferred to silicate monomers that serve as active species for the reaction, and growth of silica particles will not be promoted. Consequently, it takes time to make the curing process to sufficiently proceed, and also, strength of the produced wet gel will be low. Furthermore, there would be cases where the wet gel shrinks during drying, and a desirable silica xerogel cannot be obtained.

Furthermore, when the curing temperature exceeds 100° C., a phenomenon in which water is volatilized, and is separated from the gel inside the container, even if the container is sealed, would be observed. Accordingly, there would be cases in which the volume of the resulting wet gel is reduced, and a desirable silica xerogel cannot be obtained.

On the other hand, when the curing temperature is within a range of 60° C. to 90° C., growth of silica particles can be promoted to an appropriate degree without impairing the productivity. Furthermore, neck portions in which silica particles are connected to one another by point contact can be enhanced. In addition, curing can be carried out without volatilizing the water content in the wet gel.

The curing time is preferably 0.5 to 6 hours, more preferably 1 to 3 hours, although it depends on the curing temperature.

If the curing time is less than 0.5 hour, improvements in the strength of the gel wall may be insufficient.

If the curing time exceeds 6 hours, effects brought about by curing in terms of improvements in the strength of the gel wall will be scarce, and, to the contrary, the productivity will be impaired.

When the curing time is 1 to 3 hours, improvements in the strength of the gel wall can sufficiently be secured without impairing the productivity.

For curing conditions, the temperature/humidity and the time should be considered together. In consideration of a balance between improvements in the strength of the gel skeleton and the productivity, the curing time is preferably 1 to 3 hours under conditions of 85° C. and 85%.

In order to increase the pore volume in the xerogel and the mean pore diameter, the gelation temperature and the curing temperature are preferably increased within the above ranges, or the total of the gelation time and the curing time is preferably increased within the above ranges.

Furthermore, in order to decrease the pore volume in the silica xerogel and the mean pore diameter, the gelation temperature and the curing temperature are preferably decreased within the above ranges, or the total of the gelation time and the curing time is preferably decreased within the above ranges.

(6) Film Stripping

The curing container is taken out of the thermostat chamber, and is cooled to room temperature. Then, the cured sample is taken out of the container, and the films are stripped.

(7) Hydrophobization 1 (Hydrochloric Acid-Soaking Step)

The gel is soaked in hydrochloric acid (6 to 12 N), and then, is allowed to stand at an ordinary temperature of 23° C. for 45 minutes or more to thereby incorporate the hydrochloric acid into the gel.

(8) Hydrophobization 2 (Siloxane-Treatment Step)

The gel is soaked, for example, in a mixture solution of octamethyltrisiloxane serving as a silylating agent, and 2-propanol (IPA), i.e., an alcohol, and this is put into a thermostatic chamber at 55° C., and thus, these are reacted for 2 hours.

When trimethylsiloxane bonds start to form, the hydrochloric acid aqueous solution is discharged from the gel, and two liquid-separation occurs. Mainly, siloxane is distributed in the upper layer while the hydrochloric acid aqueous solution and 2-propanol are distributed in the lower layer.

(9) Drying

The gel is transferred to a thermostatic chamber at 150° C., and is dried therein for 2 hours.

In addition, to realize the structure shown in FIG. 1, as mentioned in (2) to (4), the unwoven fabric fibers that have been impregnated with the excessive amount of the sol solution are placed between two pieces of films, the sol solution is converted into a gel, and then, the material is caused to pass between biaxial rolls that have been set to a certain Gap.

In the above production method, the silica xerogel is continuous from the composite layer 102 to silica xerogel layers 101 present on both surfaces in the structure of FIG. 1.

However, separately, different silica xerogels may be provided on the respective silica xerogel layers 101 present on both surfaces. For example, by adhering different silica xerogels to the surfaces of the gel before the unwoven fabric fibers are passed between the biaxial rolls, different silica xerogels can be provided in the respective three layers.

Application Examples

Figure 3:
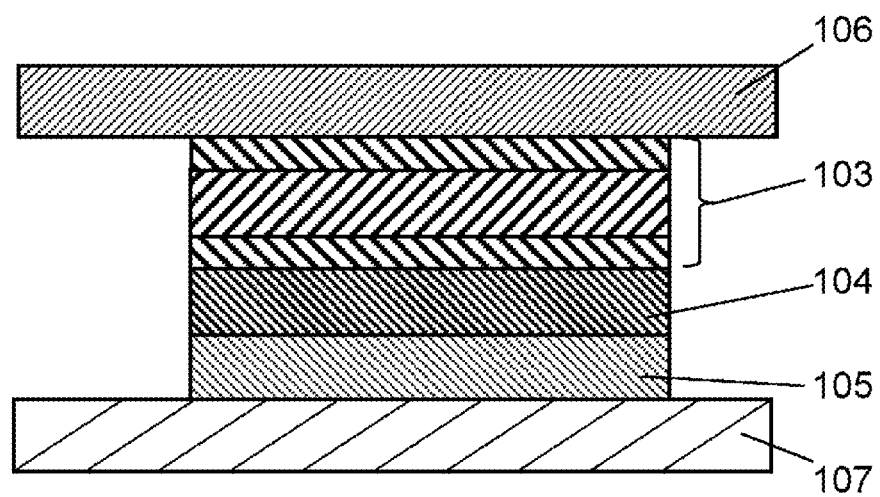
FIG. 3 is a partial cross-sectional view of an electronic device that includes the heat-insulation sheet shown in FIG. 1.

FIG. 3 shows a partial cross-section of a portable device that is an electronic device as an application example of the heat-insulation sheet 103. The heat insulation sheet 103, a graphite sheet 104, a heat-generating component 105, and a substrate 107 are placed in a casing 106 of the portable device. In other words, the portable device includes the heat-generating component 105 that is an electronic component involving heat generation, the casing 106 that houses the heat-generating component 105, and the heat-insulation sheet 103 that is placed between the heat-generating component 105 and the casing 106.

The heat from the heat-generating component 105 is dispersed through the graphite sheet 104. However, the heat is not transmitted to the casing 106. Therefore, local elevation of temperature on the surface of the casing 106 can significantly be reduced.

For measurement of thicknesses, Digimatic Indicator H0530 (MITUTOYO CORPORATION) was used. The measurement pressure was 7.4 kPa. With regard to measurement points, 15 points within respective surfaces of 10 pieces of heat-insulation sheets 103 (150 points in total) were measured to calculate mean thicknesses and thickness variations 3σ.

Details on conditions for respective examples and comparative examples will be described below. In addition, results and conditions are shown in Table 1.

TABLE 1

|  | Example 1 | Example 2 | Example 3 | Comparative Example 1 | Comparative Example 2 | Comparative Example 3 |
| --- | --- | --- | --- | --- | --- | --- |
| Unit weights of unwoven fabrics [g/m$^2$] | 105 | 12 | 8 | 105 | 12 | 8 |
| Maximum unit weights of unwoven fabrics [g/m$^2$] | 120 | 15 | 11 | 120 | 15 | 11 |
| Minimum unit weights of unwoven fabrics [g/m$^2$] | 90 | 9 | 5 | 90 | 9 | 5 |
| Thicknesses of unwoven fabric [mm] | 0.902 | 0.034 | 0.023 | 0.905 | 0.033 | 0.019 |
| Thickness variations 3σ of unwoven fabrics [%] | 20.2 | 9.6 | 11.7 | 20.2 | 7.1 | 6.6 |
| Bulk densities of unwoven fabrics [kg/m$^3$] | 116 | 353 | 348 | 116 | 364 | 421 |
| Maximum bulk densities of unwoven fabrics [kg/m$^3$] | 133 | 441 | 500 | 133 | 455 | 579 |
| Minimum bulk densities of unwoven fabrics [kg/m$^3$] | 100 | 265 | 217 | 99 | 273 | 263 |
| Areas of unwoven fabrics [mm$^2$] | 210 × 297 | 105 × 120 | 105 × 120 | 210 × 297 | 105 × 120 | 105 × 120 |
| Silica xerogel weight [g] | 10.68 | 0.064 | 0.058 | 0 | 0 | 0 |
| Silica xerogel filling ratios [wt %] | 63.1 | 30.0 | 35.8 | 0 | 0 | 0 |
| Thicknesses of heat-insulation sheets [mm] | 1.05 | 0.042 | 0.040 | 0.902 | 0.033 | 0.019 |
| Thickness 3σ of heat-insulation sheets [%] | 3.3 | 18 | 13 | 20.2 | 7.1 | 6.6 |
| Evaluations on thickness variations | Acceptable | Acceptable | Acceptable | Unacceptable | Acceptable | Acceptable |
| Thermal conductivities [W/mK] | 0.0189 | 0.0190 | 0.0220 | 0.0336 | 0.0355 | 0.0360 |
| Thermal conductivity-measuring devices | HFM 436 | TIM tester |  | HFM 436 | TIM tester |  |
| Evaluations on thermal conductivities | Acceptable | Acceptable | Acceptable | Unacceptable | Unacceptable | Unacceptable |
| Overall evaluations | Acceptable | Acceptable | Acceptable | Unacceptable | Unacceptable | Unacceptable |

In fact, this structure was applied to a smartphone or tablet. The heat transmission from the heat-generating component 105 to the casing 106 could be reduced.

EXAMPLES

Hereinafter, embodiments will be described based on examples. However, embodiments are not limited to the examples described below. All reactions are carried out under the atmosphere.
<Evaluations>

In addition, in examples, heat-insulation sheets 103 were prepared by varying the unit weight (weight of unwoven fabric fibers per unit area [g/m$^2$]) or thickness of an unwoven fabric, and thermal conductivities and thicknesses of the heat-insulation sheets 103 were measured.

For the measurement of thermal conductivities of the heat-insulation sheets 103, heat flowmeters HFM 436 Lamda (produced by NETZCH) and TIM tester (produced by Analysys Tech) were used.

<Criteria>

With regard to thermal conductivities of heat-insulation sheets 103, when samples indicated 0.024 W/mK or less, they were considered acceptable. With regard to thickness variations, when 3σ for samples indicated 20% or less, they were considered acceptable. Conditions satisfied both of the criteria were considered acceptable as overall evaluations.

The thermal conductivity of still air at ordinary temperature has been considered about 0.026 W/mK. For that reason, in order to effectively block heat flow, it is required to adjust the thermal conductivity of the heat insulation sheet 103 to a thermal conductivity smaller than that of still air. Therefore, 0.024 W/m k or less, which is about 10% lower than the thermal conductivity of the still air, was adopted as an acceptance criterion for the thermal conductivity of the heat-insulation sheet 103.

If thermal conductivities of heat-insulation sheets 103 are larger than 0.024 W/mK, advantages over the air heat insulation will be impaired since the thermal conductivity is not very different from the thermal conductivity of still air.

Furthermore, if thickness variations 3σ within surfaces of heat-insulation sheets 103 are larger than 20%, it means that thin portions locally exist within the heat-insulation sheets 103. Accordingly, heat spots cannot effectively be reduced in the thin portions. Consequently, 20% or less was adopted for an acceptance criterion for variations 3σ in thicknesses of heat-insulation sheets 103.

In Examples 1 to 3, as shown in FIG. 1, heat-insulation sheets 103 each include composite layers 102 and silica xerogel layers 101.

On the other hand, in Comparative Examples 1 to 3, heat-insulation sheets 103 do not include silica xerogel layers 101 but include only unwoven fabric fibers, and their structures are different from that of FIG. 1.

Example 1

0.31 part by weight (1.4 wt %) of concentrated hydrochloric acid serving as a catalyst was added to 22.29 parts by weight of a high-molar silicate aqueous solution (TOSO SANGYO Co., Ltd.; $SiO_2$ concentration: 14 wt %), and the resulting mixture was stirred to prepare a sol solution.

Then, the sol solution was poured into an unwoven fabric (material type: PET; thickness: 0.902 mm; area: 12 cm square; unit weight: 105 g/m$^2$), and the sol solution was pushed and impregnated into the unwoven fabric by use of a hand roll.

The unwoven fabric impregnated with the sol solution was placed between PP films (a piece 50 μm thick×2), and this was allowed to stand at a room temperature of 23° C. for 20 minutes to convert the sol into a gel.

After formation of a gel was confirmed, the impregnated unwoven fabric with films was caused to pass through biaxial rolls that have a gap set to 1.05 mm (including film thicknesses) to draw out an excessive gel from the unwoven fabric, thereby controlling the thickness to 1.00 mm, which was a target thickness.

Then, the above gel with the films was placed inside a container, and the container was placed in a thermo-hygrostat chamber at a set temperature of 85° C. and a set humidity of 85% for 3 hours. Through this process, silica particles were grown (through a dehydration-condensation reaction of silanols) to form a porous structure.

After the curing container was taken out of the thermostatic chamber, and was cooled to room temperature, the cured sample was taken out, and the films were removed.

Then, the gel was soaked in 12 N hydrochloric acid, and was allowed to stand at an ordinary temperature of 23° C. for 60 minutes to incorporate the hydrochloric acid into the gel.

Then, the gel was soaked in a mixture solution of octamethyltrisiloxane serving as a silylating agent, and 2-propanol (IPA), and these were placed in a thermostatic chamber at 55° C., and were thus reacted for 2 hours. When trimethylsiloxane bonds started to form, the hydrochloric acid aqueous solution was discharged from the gel, and it came into a state in which two liquid-separation occurred (siloxane in the upper layer and the hydrochloric acid aqueous solution and 2-propanol in the lower layer).

The gel was transferred to a thermostatic chamber that was set to 150° C., and was dried under the atmosphere for 2 hours, thereby obtaining a sheet.

As a result, a heat-insulation sheet 103 that had a mean thickness of 1.05 mm, a thickness variation 3σ of 3.3%, and a thermal conductivity of 0.0189 W/mK was obtained. The filing ratio of silica xerogel at that time was 63.1 wt %.

Figure 4A:
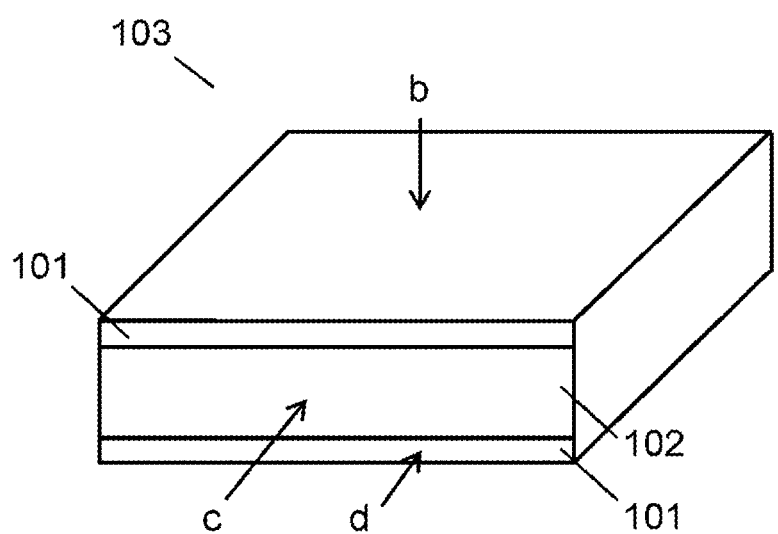
FIG. 4A is a diagram that shows parts of a heat-insulation sheet for which images were captured by scanning electron microscopy (SEM).
Figure 4B:
FIG. 4B is a diagram that shows an SEM image of the heat-insulation sheet.
Figure 4C:
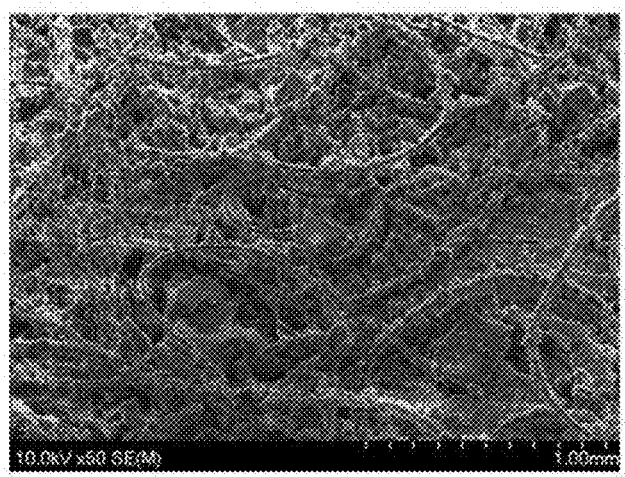
FIG. 4C is a diagram that shows an SEM image of the heat-insulation sheet.
Figure 4D:
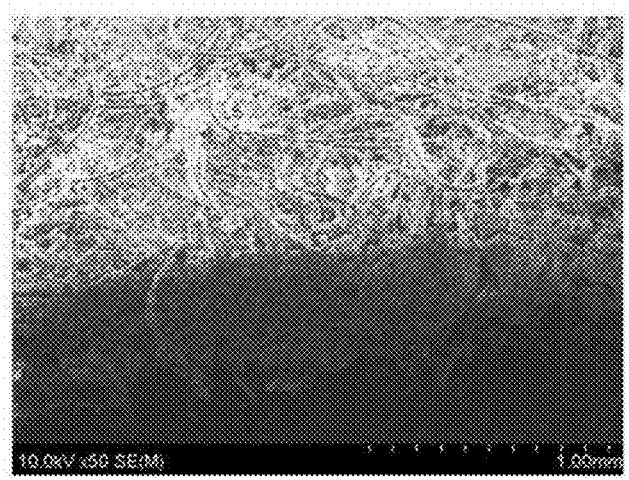
FIG. 4D is a diagram that shows an SEM image of the heat-insulation sheet.

SEM images of the resulting heat-insulation sheet 103 are shown in FIGS. 4B to 4D. Portions of the heat-insulation sheet 103 for which SEM images were captured are shown in FIG. 4A. FIG. 4B is an image that is viewed from directly above the heat-insulation sheet 103. It was confirmed that the entire face was covered with the silica xerogel.

Furthermore, FIGS. 4C and 4D are images that show cross-sections of the heat-insulation sheet 103. It was confirmed that the spatial volumes in the unwoven fabric fibers were densely filled with the silica xerogel, and single layers of the silica xerogel were formed on outermost surfaces of the unwoven fabric fibers.

Example 2

With regard to specifications of the unwoven fabric, the mean thickness and the unit weight were changed to 0.034 mm and 12 g/m$^2$, respectively, and, because of that, amounts of the materials were reduced to one-fifth of those in Example 1. Except for these conditions, a sheet was prepared in the same process conditions as Example 1.

Consequently, a heat-insulation sheet 103 that had a mean thickness of 0.042 mm, a thickness variation 3σ of 18%, and a thermal conductivity of 0.0130 W/mK was obtained. The filing ratio of silica xerogel at that time was 30.0 wt %.

Example 3

With regard to specifications of the unwoven fabric, the mean thickness and the unit weight were changed to 0.023 mm and g/m$^2$, respectively, and, because of that, amounts of the materials were reduced to one-fifth of those in Example 1. Except for these conditions, a sheet was prepared in the same conditions as Example 1.

Consequently, a heat-insulation sheet 103 that had a mean thickness of 0.040 mm, a thickness variation 3σ of 13%, and a thermal conductivity of 0.0120 W/mK was obtained. The filing ratio of silica xerogel at that time was 35.8 wt %.

Comparative Example 1

Unwoven fabric fibers that had a thickness of 0.902 mm and a unit weight of 105 g/m$^2$, and that were made of PET were used. Any silica xerogel was not combined with the unwove fabric fibers. As a result of measurement of thermal conductivity, it was 0.0336 W/mK.

Comparative Example 2

With regard to specification for unwoven fabric fibers, the mean thickness and the unit weight were changed to 0.034 mm and 12 g/m$^2$, respectively. Any silica xerogel was not combined with the unwove fabric fibers. As a result of measurement of thermal conductivity, it was 0.0355 W/mK.

Comparative Example 3

With regard to specification for unwoven fabric fibers, the mean thickness and the unit weight were changed to 0.023 mm and 8 g/m$^2$, respectively. Any silica xerogel was not combined with the unwove fabric fibers. As a result of measurement of thermal conductivity, it was 0.0343 W/mK.

<Results>

In Examples 1 to 3, in-plane thickness variations 3σ are 20% or less, and thermal conductivities are 0.010 to 0.024 W/mK. As a result, it was revealed that the unit weight of unwoven fabric fibers needs to be 5 to 120 g/m$^2$, and that the bulk density of unwoven fabric fibers needs to be 116 to 345 kg/m$^3$, or 100 to 500 kg/m$^3$ in consideration of variations.

Based on these results and SEM images of the heat-insulation sheet 103 in FIGS. 4B to 4D, the following requirement can be considered. That is, it was revealed that a composite layer 102 that is formed by filling a silica xerogel into spatial volumes in unwoven fabric fibers, and silica xerogel layers 101 (single layers) on outermost surfaces of the unwoven fabric fibers need to be formed.

In addition, the range of the unit weight of unwoven fabric fibers is a range that is defined based on minimum and maximum unit weights. The range of the effective bulk density of unwoven fabric fibers is also a range that is defined by maximum and minimum bulk densities in consideration of variations.

<Additional Information>

In addition, it is not necessarily required that silica xerogel layers 101 are present on both surfaces of the composite layer 102, and such a configuration corresponds to preferable examples.

INDUSTRIAL APPLICABILITY

Heat-insulation sheets according to the disclosure are utilized inside a wide variety of electronic devices. They are applied to information devices, portable devices, displays, electricity equipment, etc., namely all products that are associated with heat.

REFERENCE MARKS IN THE DRAWINGS 101 silica xerogel layer
102 composite layer
103 heat-insulation sheet
104 graphite sheet
105 heat-generating component
106 casing
107 substrate

The invention claimed is:

1. A heat-insulation sheet, comprising:
   a first silica xerogel layer that has a network structure in which first silica particles are connected through point contact; and
   a composite layer that is located on one surface of the first silica xerogel layer, and that includes at least one type of unwoven fabric fibers and second silica xerogel particles, wherein
   the second silica xerogel particles are located in a spatial volume of the unwoven fabric fibers, the first silica xerogel layer does not include fibers, and
   the first silica xerogel particles and the second silica xerogel particles are hydrophobicized.

2. The heat-insulation sheet according to claim 1, wherein the unwoven fabric fibers have a bulk density within a range from 100 kg/m$^3$ to 500 kg/m$^3$.

3. The heat-insulation sheet according to claim 1, wherein the thickness of the heat-insulation sheet is within a range of 0.03 mm to 1.5 mm.

4. The heat-insulation sheet according to claim 1, wherein the unwoven fabric fibers include inorganic unwoven fabric fibers as a main component.

5. The heat-insulation sheet according to claim 1, wherein the unwoven fabric fibers include organic unwoven fabric fibers as a main component.

6. An electronic device, comprising:
   an electronic component that involves heat generation;
   a casing that houses the electronic component; and
   the heat-insulation sheet according to claim 1, the heat-insulation sheet being placed between the electronic component and the casing.

7. The heat-insulation sheet according to claim 1, further comprising a second silica xerogel layer that includes a third silica xerogel, wherein the composite layer is located between the first silica xerogel layer and the second silica xerogel layer.

8. The heat-insulation sheet according to claim 7, wherein at least one of the first silica xerogel layer and the second silica xerogel layer has a thickness of 10 nm or more, and
   the first silica xerogel layer is a single layer of the first silica xerogel, or the second silica xerogel layer is a single layer of the third silica xerogel.

9. The heat-insulation sheet according to claim 7, wherein at least one of the first silica xerogel layer and the second silica xerogel layer has a thickness of 100 nm or less.

10. The heat-insulation sheet according to claim 7, wherein the first silica xerogel, the second silica xerogel, and the third silica xerogel are the same silica xerogel.

11. The heat-insulation sheet according to claim 7, wherein the first silica xerogel, the second silica xerogel, and the third silica xerogel are continuous, and connected.

12. The heat-insulation sheet according to claim 7, wherein the second silica xerogel layer does not include fibers.

13. The heat-insulation sheet according to claim 1, wherein thickness variations 3σ within surface of the heat-insulation sheet are 20% or less.

14. The heat-insulation sheet according to claim 1, wherein the thermal conductivities of the heat-insulation sheets are smaller than 0.024 W/mk.

15. The heat-insulation sheet according to claim 1, wherein the proportion of the silica xerogel in the heat-insulation sheet is more than 30 wt % and less than 80 wt %.

16. The heat-insulation sheet according to claim 1, wherein the first silica xerogel layer is present over the entire surface of the composite layer.

17. The heat-insulation sheet according to claim 1, wherein a shape of the first silica xerogel layer and the composite layer are a flat plate shape.

18. The heat-insulation sheet according to claim 1, wherein
   a shape of the first silica xerogel layer and the composite layer are a flat plate shape and a thickness of the unwoven fabric fibers is 60% to 90% of a thickness of the heat-insulation sheet.

19. A heat-insulation sheet, comprising:
   a first silica xerogel layer that includes a first silica xerogel; and
   a composite layer that is located on one surface of the first silica xerogel layer, and that includes at least one type of unwoven fabric fibers and a second silica xerogel, wherein
   the second silica xerogel is located in a spatial volume of the unwoven fabric fibers, the first silica xerogel layer does not include fibers,
   the first silica xerogel and the second silica xerogel are hydrophobicized, and
   a thickness variation 3σ of the heat insulation sheet is 3.3% or more and 20% or less.

20. A heat-insulation sheet, comprising:
   a first silica xerogel layer that includes a first silica xerogel; and a composite layer that is located on one surface of the first silica xerogel layer, and that includes at least one type of unwoven fabric fibers and a second silica xerogel, wherein the second silica xerogel is located in a spatial volume of the unwoven fabric fibers, the first silica xerogel layer does not include fibers, and the first silica xerogel and the second silica xerogel are reacted with hydrochloric acid and a silylating agent to hydrophobicize the first silica xerogel and the second silica xerogel.

* * * * *